United States Patent [19]

Trihey

[11] 4,249,495
[45] Feb. 10, 1981

[54] INTERNAL COMBUSTION ENGINE AND HEAD THEREOF

[75] Inventor: John M. Trihey, Bayswater, Australia

[73] Assignee: Malz Nominees Pty. Ltd., Caulfield, Australia

[21] Appl. No.: 861,929

[22] Filed: Dec. 19, 1977

[30] Foreign Application Priority Data

Dec. 21, 1976 [AU] Australia ............................ 8566/76

[51] Int. Cl.³ .......................................... F02B 15/00
[52] U.S. Cl. ...................................... 123/432; 123/308
[58] Field of Search ............ 123/32 ST, 32 SP, 30 C, 123/75 B, 188 M, DIG. 4

[56] References Cited

U.S. PATENT DOCUMENTS

| Re. 26,603 | 6/1969 | Von Seggern et al. ......... 123/32 ST |
| 1,555,991 | 10/1925 | Konar ................................. 123/75 B |
| 2,466,181 | 4/1949 | Myrick ............................... 123/75 B |
| 3,087,480 | 4/1963 | Baudry ............................... 123/75 B |
| 3,364,911 | 1/1968 | Baudry et al. ..................... 123/75 B |
| 3,382,850 | 5/1968 | Baudry et al. ..................... 123/75 B |
| 3,926,158 | 12/1975 | Dolza, Sr. .......................... 123/75 B |
| 4,018,193 | 4/1977 | Klomp .............................. 123/75 B |
| 4,106,439 | 8/1978 | Kanao ............................ 123/DIG. 4 |

FOREIGN PATENT DOCUMENTS

2500366 7/1975 Fed. Rep. of Germany ......... 123/75 B

Primary Examiner—Ronald H. Lazarus
Attorney, Agent, or Firm—Blanchard, Flynn, Thiel, Boutell & Tanis

[57] ABSTRACT

An ignition engine comprising a cylinder head, a cylinder and a piston reciprocable therein, first inlet means for admitting a first gas which contains fuel into a central region of the cylinder, and second inlet means for admitting a second gas which does not contain fuel or contains significantly less fuel than the first gas, said second gas being confined generally adjacent to the cylinder walls, and an ignition device located generally centrally of the cylinder head.

10 Claims, 13 Drawing Figures

INTERNAL COMBUSTION ENGINE AND HEAD THEREOF

FIELD OF THE INVENTION

This invention relates to internal combustion engines. It is particularly concerned with two and four stroke ignition engines.

BACKGROUND OF THE INVENTION

An object of the invention is to provide an engine which is generally more efficient by reducing heat losses through the cylinder walls.

A further object is to provide an engine in which the effective compression ratio remains relatively high and is not reduced at low throttle settings.

More specifically, the invention provides an ignition engine comprising a cylinder head, a cylinder and a piston reciprocable therein, first inlet means for admitting a first gas which contains fuel into a central region of the cylinder, and second inlet means for admitting a second gas which does not contain fuel or contains significantly less fuel than the first gas, said second gas being confined generally adjacent to the cylinder walls, and an ignition device located generally centrally of the cylinder head.

In practice, the first gas will normally comprise an air-fuel mixture and the second gas will comprise air.

In one arrangement the first and second inlet means may comprise first and second ducts, the first duct being arranged to admit the first gas generally axially of the cylinder, the second duct being arranged to admit the second gas with a tangential component of velocity relative to the cylinder.

The two ducts may be connected to a common inlet port formed in the cylinder head of the engine, said port being opened or closed by a valve. Alternatively, the ducts may be connected to respective inlet ports in the cylinder head each being opened or closed by respective valves.

Valves are preferably provided in the ducts for controlling flow therethrough, said valves being arranged to operate in complementary manner so that as the volume of flow of the first gas increases the volume of flow of the second decreases and vice versa. The arrangement is such that at low throttle settings when small charges of air-fuel mixture are admitted to the cylinder, a significantly greater proportion of air is admitted to the cylinder through the second duct. On the other hand, at full throttle, the valves are arranged to admit a full charge of air fuel to the cylinder and to substantially block flow of air to the cylinder via the second duct.

In an alternative arrangement, the first duct is connected to an inlet port formed in the cylinder head and the second inlet means comprises ports formed through the cylinder wall, which ports are opened by the piston as it sweeps past the cylinder wall near the bottom of its stroke. In this arrangement, at low throttle settings a considerable vacuum will be present in the cylinder at or near bottom dead centre so that when the ports are opened air will enter the cylinder with considerable velocity. By arranging for the ports to be tangential and/or the piston top to be formed appropriately the inrushing air swirls about the inner surface of the cylinder walls. The air having a much higher velocity than the fuel-rich charge tends to remain adjacent to the cylinder wall and not to mix significantly with the fuel-rich charge. Provided the air has sufficient tangential velocity, separation will be maintained during the compression stroke of the piston whereby the air-fuel charge, which is of approximately stoichiometric proportions, is not diluted with the admitted air and hence reliable ignition can still be obtained.

The presence of air swirling about the interior of the cylinder wall also has the beneficial effect of reducing heat losses through the cylinder wall thereby increasing efficiency of the engine and decreases the problem of cooling of the engine.

The invention also provides a head for use on an internal combustion engine said head having a lower surface for mounting on an engine block a recess formed into said surface to serve as a combustion chamber in use of the head, an air-fuel inlet duct and an exhaust duct opening into the recess characterised by the provision of an air duct which opens into the recess and is directed tangentially relative thereto.

BRIEF DESCRIPTION OF THE DRAWINGS

The invention will now be further described with reference to the accompanying drawings, in which.

DETAILED DESCRIPTION

The principles of the invention are equally applicable to two-stroke and four-stroke engines and some examples of the latter will be described first. The same reference numerals are used to denote corresponding components throughout all drawings.

Figure 1:
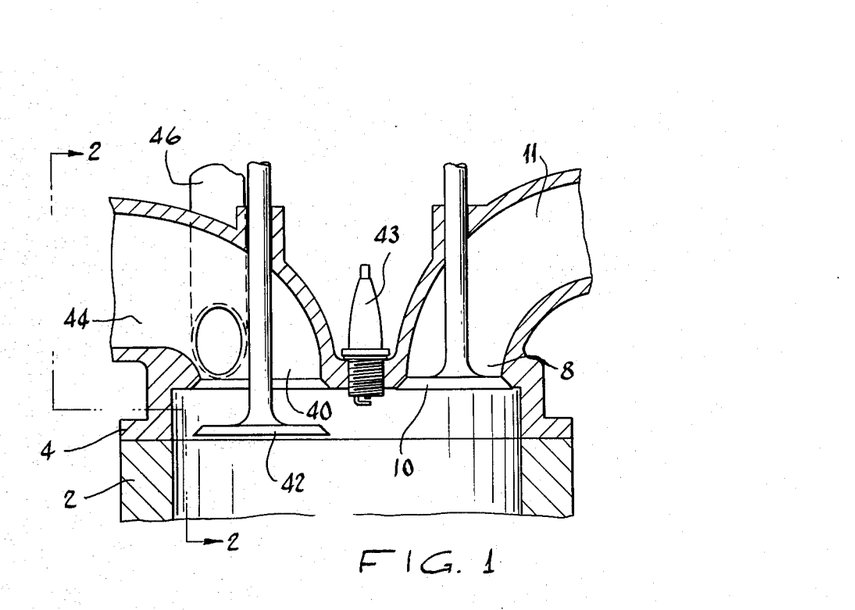
FIG. 1 is an axial cross-sectional view through a head embodying the invention and for use with a four-stroke engine and showing the inlet valve open and the exhaust valve closed.
Figure 2:
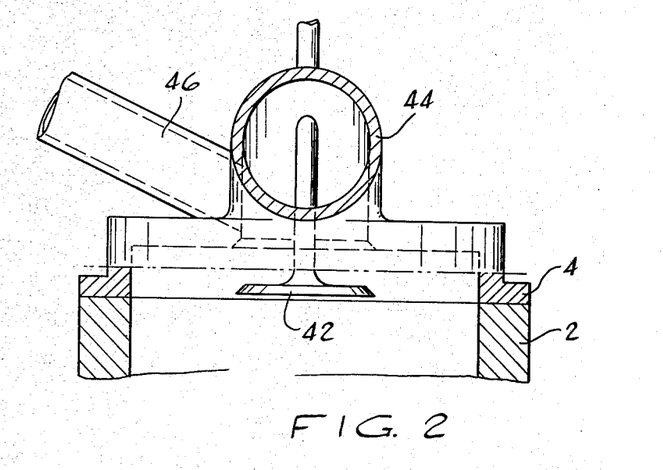
FIG. 2 is a cross-sectional view taken along the line 2—2 marked on FIG. 1.
Figure 3:
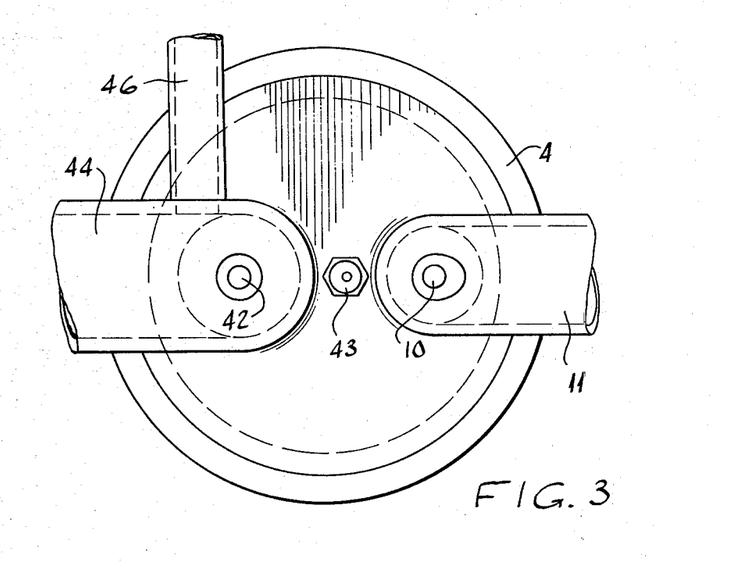
FIG. 3 is a top plan view of the arrangement shown in FIG. 1.

FIGS. 1 to 4 illustrate a four-stroke engine having an inlet port 40, inlet valve 42, exhaust port 8, exhaust valve 10 and exhaust duct 11 formed into a head 4 mounted on cylinder 2. The inlet port 40 is connected to two inlet pipes 44 and 46. The inlet pipe 44 is connected to a carburettor in the usual manner and extends to the port 40 via a generally vertical portion so as to introduce air-fuel mixture into the cylinder generally centrally thereof and without any substantial tangential component. It will be noted that the effective outlet opening of the air-fuel pipe 44 is located inwardly of the valve 42 so that the latter helps to deflect the air-fuel towards the centre of the cylinder. The second inlet pipe 46 is for admission of a non-combustible gas such as air so as to swirl adjacent to the cylinder wall. It is of smaller diameter than the pipe 44 and extends downwardly and tangentially of the cylinder radially outboard of axis. More particularly, and as seen in FIGS. 1 to 3, the second inlet pipe 46 slopes downward in a chordal plane of the cylinder upward of the stem of the inlet valve 42, such chordal plane being parallel to the upstanding cylinder axis and substantially perpendicular to the radially extending portion of the inlet pipe 44. The second inlet pipe 46 ends at an opening in the upstanding, substantially circumferentially facing sidewall of the inlet pipe 44. The axis of the second inlet pipe 46 extends from such ending thereof at the opening in the sidewall of inlet pipe 44, at a downward slope in such chordal plane through the terminal portion 40 of the inlet pipe 44 to angle (as can be seen from FIG. 2) down under the level of the radially extending part of the inlet pipe 44 and above the open position of the head of the valve 42. The end of the pipe 46 is located near the cylinder wall so that air is discharged therefrom with a substantial downward and tangential component so that the air will swirl about the inner wall of the cylinder leaving the air-fuel mixture in a core in the center of this cylinder. During, the downward induction stroke and the upward compression stroke of the piston the air which has been admitted through the pipe 46 will tend to remain circulating about the inner wall of the cylinder whereas the air-fuel mixture admitted through the pipe 44 will remain in the central core of the cylinder. This separation is assisted by heating the air-fuel mixture so as to reduce its effective density. A spark plug 43 or other igniting device is provided centrally of the head of the engine so as to ignite the air-fuel mixture located in the central core. Further, the pipes 44 and 46 may be provided with out-of phase butterfly valves (not shown but as hereafter discussed with respect to FIG. 10) so as to reduce the amount of air admitted at higher throttle settings but this may not be necessary since the pipe 46, being open to the atmosphere, will tend to admit less air when the vacuum level in the head is not great at higher throttle settings. Ignition is facilitated at low throttle settings since the fuel is concentrated around the plug 43. Further, the air surrounding the fuel mixture acts to cushion the exploding fuel and thus making it possible to use lead-free fuels. Still further, the air adjacent to the cylinder wall tends to reduce heat losses through the cylinder wall, thus contributing to the efficiency of the engine.

Figure 4:
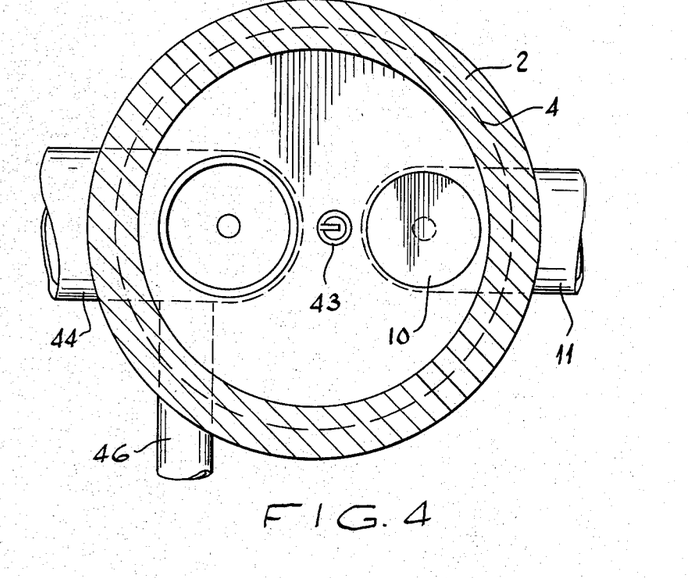
FIG. 4 is a view into the head from beneath the arrangement shown in FIG. 1, with the inlet valve removed for clarity.
Figure 5:
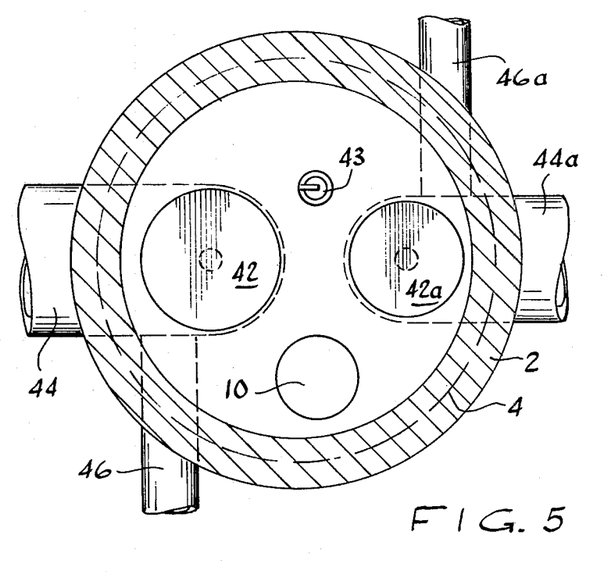
FIG. 5 is a view looking into the head from beneath of a modified arrangement of the invention.

FIG. 5 illustrates a modified form of the invention and can be considered as generally similar to the arrangement shown in FIGS. 1 and 4, except that the inlet pipes 44 and 46 are duplicated. The additional air-fuel and air pipes 44a and 46a are located diametrically opposite to the pipes 44 and 46, the ends of air fuel pipes 44 and 44a being directed at one another so that the streams of air-fuel issuing therefrom meet near the centre of the cylinder and will tend to move downwardly in the central region of the cylinder, thereby countering any tendency of streams of air-fuel to be projected fully across the cylinder. The air pipes 46 and 46a are oppositely directed so that the streams of air issuing therefrom swirl in the same direction. The inlet valve 42a can be mechanically coupled to the valve 42 so that a complete cylinder head embodying this concept can be manufactured and fitted to existing engines which are designed for the normal two valves per cylinder.

Figure 6:
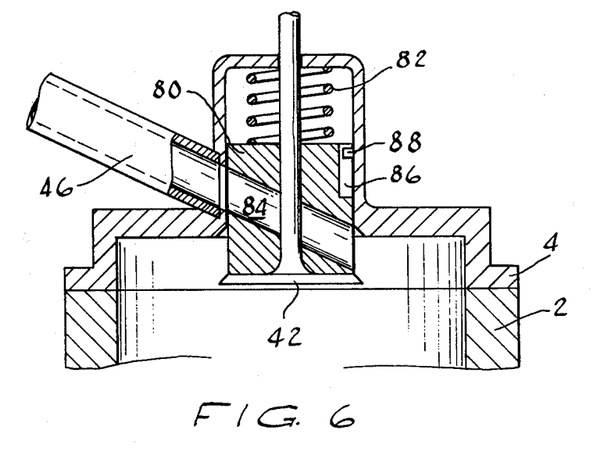
FIG. 6 is a cross-sectional view through a further modified form of the invention.

FIG. 6 illustrates a modified form of inlet valve arrangement wherein a cylindrical block 80 is located on the stem of the inlet valve 42 and biased against the head of the valve by a compression spring 82. The block 80 is formed with a diagonally extending bore 84 which, when the valve 42 is open, is aligned with the air inlet pipe 46 and thus enables positive separation of the swirling air from the air-fuel admitted via the pipe 44. The block 80 is formed with a generally axially extending bore or flat (not seen in FIG. 6) to permit air-fuel to flow towards the centre of the cylinder when the valve 42 is open. The block 80 is formed with an axial groove 86 within which is located a projection 88 from the head 4 to prevent the block 80 from rotating with the valve. The block 80 could be made integral with or fixed to the valve arrangement shown in FIG. 6. Such a block would be formed with a bore for air from the pipe 46 and with a flat for air-fuel from the pipe 44.

Figure 7:
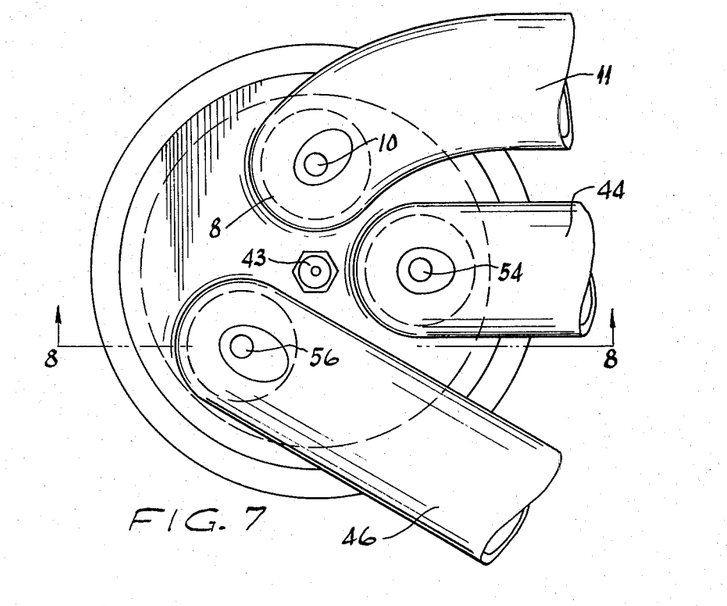
FIG. 7 is a schematic top plan view of a three valve head.
Figure 8:
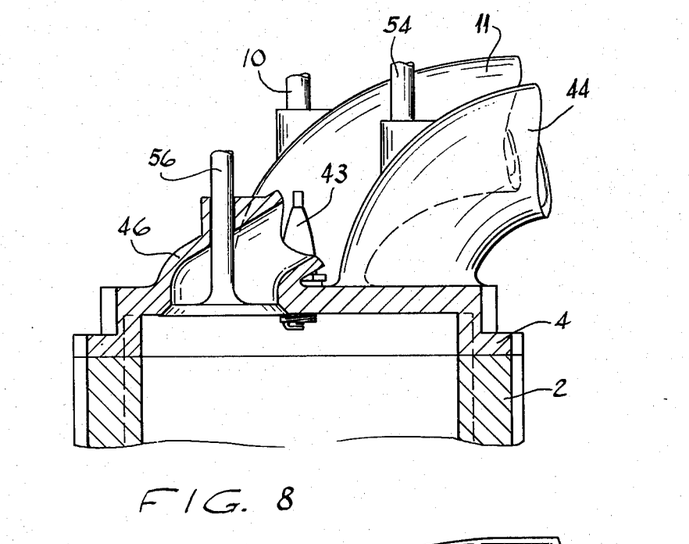
FIG. 8 is a schematic cross-section through the three-valve four-stroke engine taking along the line 8—8 marked on FIG. 7.

A slightly modified form of four-stroke engine is illustrated schematically in FIGS. 7 and 8. In this arrangement, separate inlet ports are provided for the pipes 44 and 46 respectively with separate valves 54 and 56 for the ports. As best seen in FIG. 4 the air inlet pipe 46 has a substantial component in the tangential direction so that air passing therethrough is provided with a correspondingly directed tangential component, which is clockwise as seen in FIG. 7.

It is preferred to locate the exhaust port and valve 8 and 10 next to the port of the pipe 46, in the clockwise direction so that air admitted through that port will pass smoothly over the closed exhaust valve 10. The air admitted through the pipe 46, having downward as well as tangential components of velocity should clear the downwardly projecting valve 54 of the air-fuel inlet pipe 44 so as not to upset the flow patterns of air-fuel and air admitted to the cylinder.

Figure 9:
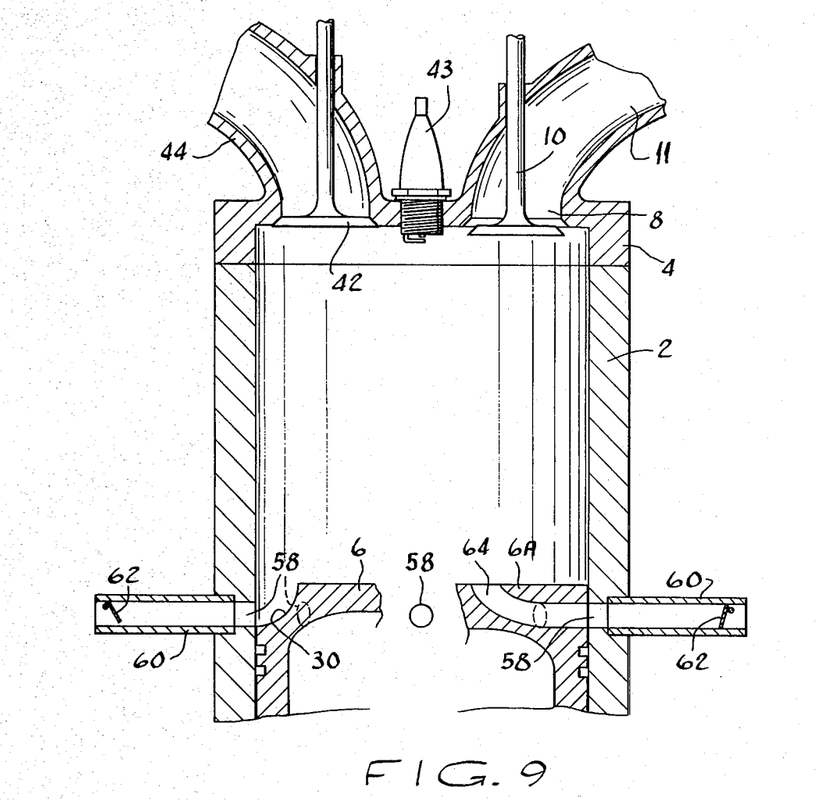
FIG. 9 is a schematic axial cross-section through a two-valve four-stroke engine having air inlet ducts formed in the cylindrical wall.

A modified form of four-stroke engine is illustrated schematically in FIG. 9. In this arrangement, the head is generally the same as that illustrated in FIGS. 7 and 8 except that the air inlet pipe 46, port 52 and valve 56 are not present. Tangentially directed air is admitted to the cylinder at the bottom stroke of the piston 6. In its simplest form, a series of tangential ducts 58 may be formed through the cylinder wall so as to admit tangentially directed air at the bottom stroke of the piston. This arrangement has the advantage that it is unnecessary to provide valving arrangements to regulate the amount of air admitted through the ports 58 in accordance with the throttle setting since the amount of air admitted through the ports 58 will be proportional to the level of vacuum within the cylinder and is therefore inherently self-regulating. It is preferred to form a groove 30 around the top of the piston 6 (as seen in the left hand side of FIG. 9) so as to assist in directing the incoming air upwardly and towards the cylinder wall. This is particularly important at the times when the ports 58 are first opened since at those times the air tends to be directed radially inwardly rather than tangentially.

Again, during the upward compression stroke of the piston the air swirling about the inner wall of the cylinder tends to remain in that position leaving the air-fuel in a central core in the cylinder. The operation of the engine during the ignition storke is essentially the same as that described previously and need not be described in detail.

In the arrangement of FIG. 9 inlet tubes 60 are connected to the ports 58 and extend tangentially away from the cylinder wall 2, flap valves 63 being provided in the ends of the tubes. The purpose of the tubes 60 is to permit any residual exhaust gases to flow into the tubes 60, when the piston first exposes the ports 58. The exhaust gases will be retained within the tubes 60 since the flap valves 62 will close. At this stage the exhaust valve 10 will be open and the pressure within the cylinder will fall and any exhaust gases within the tubes 60 will be drawn back into the cylinder and some air may flow through the tubes 60.

The piston 6A illustrated in the right hand side of FIG. 9 is different from that illustrated in the left hand side in that the groove 30 is omitted and the ports 58 open into ducts 64 formed through the top of the piston 6A, which ducts are so shaped as to produce tangentially swirling air adjacent to the cylinder wall.

Figure 10:
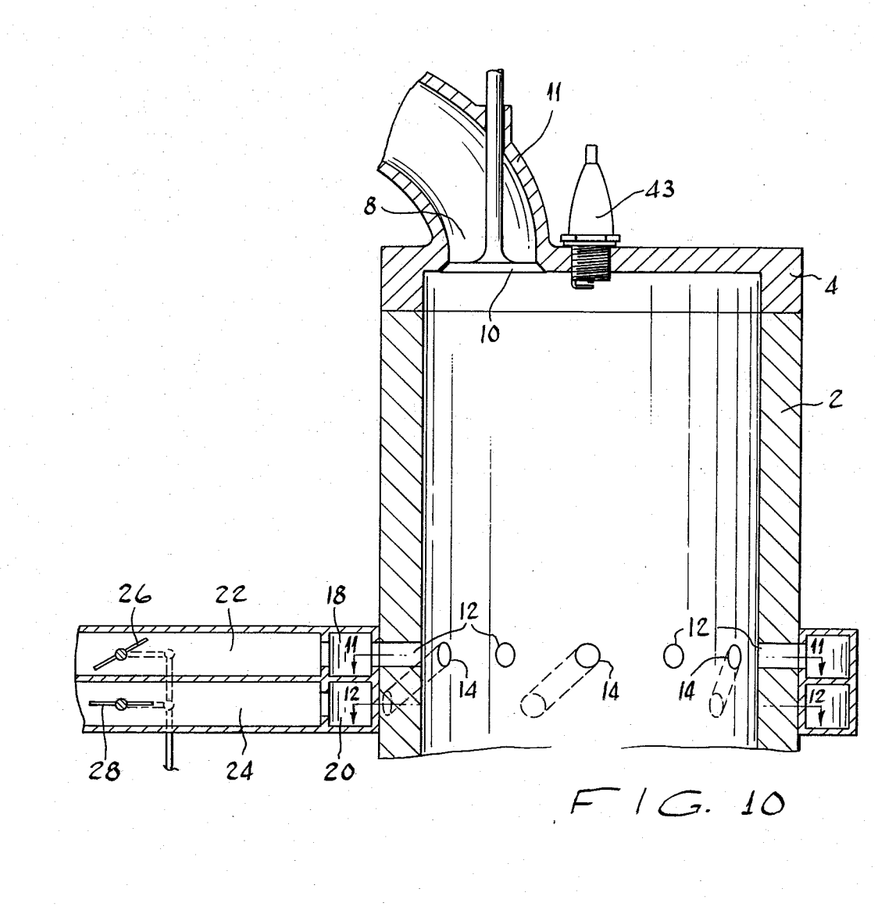
FIG. 10 is a schematic view of a two-stroke engine constructed in accordance with the invention.
Figures 11, 12, 13:
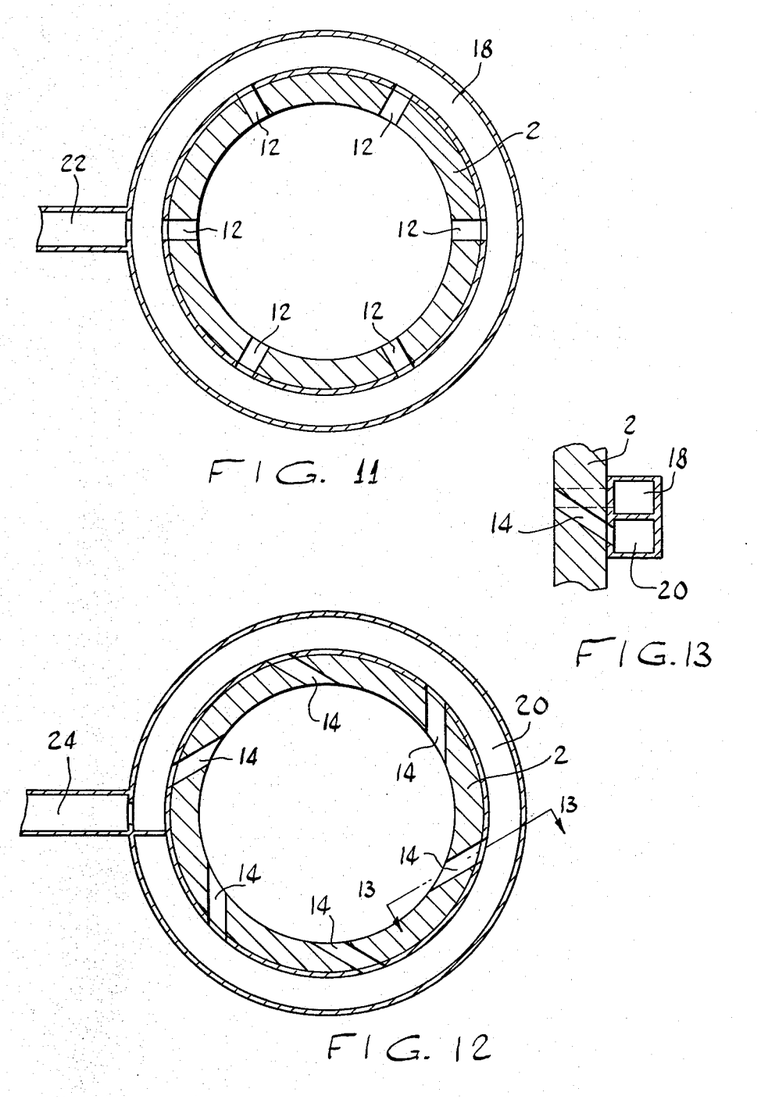
FIGS. 11, 12 and 13 are cross-sectional views taken along the lines, 11—11, 12—12 and 13—13 marked on FIGS. 10, 10 and 12, respectively.

The engine illustrated in FIGS. 10 to 13 is a two-stroke ignition engine having a cylinder wall 2, cylinder head 4, outlet port 8, outlet valve 10 and piston which has been omitted for clarity of illustration. In FIG. 10, the piston is at or near bottom dead center of its stroke and it opens two sets of inlet ports 12 and 14 located in a ring through the cylinder wall. Extending about the cylinder wall 2 is an inlet manifold which is divided into an upper chamber 18 and a lower chamber 20 which are in communication with the ports 12 and 14 respectively. As best seen in FIGS. 11 and 13 the inlet ports 12 extend radially inwardly whereas the inlet ports 14 extend upwardly and tangentially. In use, air-fuel from a carburettor or the like is admitted to the upper chamber 18 via inlet pipe 22 so that the air fuel mixture is directed towards the centre of the cylinder chamber. An inert gas such as air is admitted to the lower chamber 20 via inlet pipe 24 and the gas will issue into the cylinder with a substantial upward and tangential component of velocity. The inlet pipes 22 and 24 have butterfly valves 26 and 28 mounted in them and are arranged to be operated in anti-phase. In other words, when the valve 26 is fully open the valve 28 is closed corresponding to a condition in which the throttle is fully opened, maximum air-fuel mixture being admitted through the ports 12 and not inert gas or less inert gas or air being admitted through the ports 14. On the other hand, at low throttle settings, the valve 26 is nearly fully closed and the valve 28 is fully open so that a small quantity of air-fuel is admitted to the cylinder whereas a relatively large amount of air is admitted to the cylinder through the ports 14. In this latter condition, seeing that only a small quantity of air-fuel is admitted to the cylinder, its velocity will be relatively low. On the other hand, the volume of air is relatively high and thus its velocity will be large. The effect of this is that the high velocity air will swirl within the cylinder adjacent to the cylinder wall leaving the low velocity air-fuel mixture in a central core in the cylinder. This condition will not be substantially affected during the upward compression stroke of the piston.

After ignition, the air-fuel charge will expand radially outwardly and downwardly and the circulating additional air will serve as a cushion for the expanding ignited gases and will almost certainly prevent "knocking" from occurring. It is quite probable that lead-free fuels could be used satisfactorily in the engine of the invention. Further, the circulating air adjacent to the cylinder walls has the effect of thermally insulating the cylinder walls, thereby decreasing heat flow through the cylinder walls. This significantly increases the efficiency of the engine and moreover decreases the cooling capacity required for the engine. It may be possible for an engine to be constructed without the need for any cooling system, other than air cooling fins on the exterior of the cylinder wall or with much less cooling capacity than is usually required.

Towards the end of the downstroke of the piston 6 the valve 10 is opened to permit escape of exhaust gases. In some circumstances, there may be relatively high pressure within the cylinder when the piston first passes the ports 12 and 14 so that there may be some tendency for exhaust gases to pass through those ports. In that event, flap valves or the like (not shown) could be mounted in the inlet pipes 22 and 24 to prevent back flow of exhaust gases. It is thought however that such back flow will not take place and the valve will not be necessary because of the high pressure of the air-fuel and air admitted. When the piston first encounters the tops of the ports 12 and 14 during the down stroke, there being no back pressure of exhaust within the cylinder, air issuing into the chamber through the ports 14 will tend to be projected radially rather than tangentially into the cylinder. To counter this effect it is preferred that the top of the piston be formed with a circumferential groove as is illustrated in FIG. 9. In a modified arrangement the piston top could be formed with ducts which connect to the ports 14, and/or the ducts 12.

The two-stroke arrangement of FIGS. 10 to 13 could operate with a separate compression cylinder which is used to compress both the air for the air-fuel charge and for the additional air. The outlet of the compression cylinder branches into the two pipes 22 and 24, the carburettor would be enclosed within a pressure tight container which is open to the pressure in the pipe 22 so that the carburettor will function in the normal way, despite the higher level of pressure at the throat of the carburettor. In a modified arrangement one compression cylinder could be provided for the additional air, a further compression cylinder provided for the air-fuel, down stream of the carburettor whereby the carburettor need not be enclosed in the pressure tight container. Alternatively, crankcase compression could be used in place of the separate compressor cylinder.

Throughout all embodiments it will be noted that the interiors of the cylinder heads are relatively smooth and do not have projections which could tend to disturb the flow pattern of the gases within the cylinder. Thus, the combustion chambers preferably comprise surfaces of revolution about the axis of the cylinders. Further, it is preferred that the valve heads are recessed into the cylinder heads so as not to project into the combustion chambers when closed.

In some arrangements it may be desirable to heat the air-fuel before admission to the cylinder to make it less dense thereby further assisting in maintaining separation of the air-fuel and air.

In four-stroke engines embodying the invention the effective compression ratio is maintained at a high level and thus oil does not tend to be sucked past the piston rings into the combustion chamber, as happens in conventional four-stroke engines when operating at higher vacuum levels in the manifold. This further reduces the quantity of pollutants in the exhaust.

It appears to be desirable to construct engines of the invention of larger capacity than their conventional counterparts and operate them at part load thereby ensuring that at least some air is admitted tangentially to the cylinders at all settings and the attendant advantages obtained.

The head configuration illustrated in FIGS. 1 to 4 has been tested and found to have very satisfactory results in terms of efficiency, cooling and exhaust emissions. Further, the engine was found to be relatively insensitive to ignition timing, thereby indicating that the need for regular tuning of the engine is unnecessary. Still further, there was no evidence of pre-ignition, even with non-leaded fuels, indicating that higher compression ratios could be used which would further increase the efficiency of such engines.

What is claimed is:

1. An internal combustion engine comprising:

at least one cylinder;

a cylinder head having a combustion chamber formed therein, said chamber being shaped substantially as a surface of revolution with a substantially planar upper surface, said combustion chamber being free of projections beyond said substantially planar upper surface;

a piston reciprocable in the cylinder;

first inlet means for directing a first gas which contains fuel toward the center of the cylinder without a significant tangential component of velocity, the first inlet means including a substantially radially extending first duct which has a terminal portion which opens to said combustion chamber through an inlet valve and is generally parallel to the axis of the cylinder;

second inlet means for admitting a second gas which does not contain fuel or contains significantly less fuel than the first gas, said second inlet means including a second duct which is generally tangential to the cylinder and admits the second gas tangentially relative to the circumference of the cylinder, said second duct sloping downward in a chordal plane of the cylinder outboard of the stem and said inlet valve, said second duct ending at an opening in the upstanding, substantially circumferentially facing sidewall of said first duct, the axis of said second duct extending from said ending of said second duct at said opening at said downward slope relative to the stem of said inlet value in said chordal plane through said terminal portion of said first duct to angle down under the level of the radially extending part of said first duct and above the open position of the head of said valve, such that said first and second ducts direct their respective gas streams at respective angles downwardly in respective mutually substantially perpendicular planes each parallel to the cylinder axis, with said second gas stream crossing under said first gas stream, said second gas being confined generally adjacent to the cylinder wall whereby the circulating second gas remains substantially separated from the non-circulating first gas during compression of said first and second gases into the combustion chamber by said piston; and an ignition device located generally centrally of the cylinder head and projecting into said combustion chamber so as to project into the compressed, non-circulating first gas on compression thereof by the piston.

2. An engine as claimed in claim 1 wherein the first and second ducts are duplicated and lie at diametrically opposed locations relative to the combustion chamber.

3. An engine as claimed in claim 1 wherein the other end of the second duct is open to the atmosphere, there being no air control valve in said air duct for controlling the rate of flow through the air duct to the cylinder.

4. An engine as claimed in claim 1 wherein the second inlet means comprises at least one tangential duct formed through the cylinder wall and opening into the cylinder adjacent to the bottom dead centre position of the piston.

5. An engine as claimed in claim 4 wherein the piston is formed with a groove or grooves which deflect air admitted to the cylinder through the second inlet means towards the cylinder walls.

6. An engine as claimed in claim 4 wherein the piston top is formed with ducts which register with said at least one tangential duct.

7. An engine as claimed in claim 1 wherein the first and second inlet means have valves which are out of phase relative to one another.

8. An engine as claimed in claim 1 including heating means for enhancing separation of the first and second gases by heating the first gas prior to admission to the cylinder.

9. A head for use on an internal combustion engine having a block with at least one cylinder formed therein and a piston reciprocable in the cylinder, said head having a combustion chamber formed therein, said chamber being shaped substantially as a surface of revolution with a generally planar upper surface and being free of projections beyond said substantially planar upper surface, first inlet means for directing a first gas which contains fuel towards the center of the cylinder without a significant tangential component of velocity, the first inlet means including a substantially radially extending first duct which has a terminal portion which opens to said combustion chamber through an inlet valve and is generally parallel to the axis of the cylinder, second inlet means for admitting a second gas which does not contain fuel or contains significantly less fuel than the first gas, said second inlet means including a second duct which is generally tangential to the cylinder and admits the second gas tangentially relative to the circumference of the cylinder, said second duct sloping downward in a chordal plane of the cylinder outboard of the stem of said inlet valve, said second duct ending at an opening in the upstanding, substantially circumferentially facing sidewall of said first duct, the axis of said second duct extending from said ending of said second duct at said opening at said downward slope relative to the stem of said inlet valve in said chordal plane through said terminal portion of said first duct to angle down under the level of the radially extending part of said first duct and above the open position of the head of said valve, such that said first and second ducts direct their respective gas streams at respective angles downwardly in respective mutually substantially perpendicular planes each parallel to the cylinder axis, with said second gas stream crossing under said first gas stream, said second gas being confined generally adjacent to the cylinder wall whereby in use the circulating second gas remains substantially separated from the non-circulating first gas during compression of said first and second gases into the combustion chamber by said piston and an ignition device located generally centrally of the cylinder head and projecting into the combustion chamber so as to project into the compressed, non-circulating first gas on compression thereof by the piston.

10. An internal combustion engine comprising
a cylinder head,
a cylinder with a combustion chamber formed therein and a piston reciprocable therein,
a first inlet means for directing a first gas which contains fuel toward the center of the cylinder without a significant tangential component of velocity,
a second inlet means for admitting a second gas which does not contain fuel or contains significantly less fuel than the first gas, said second gas being confined generally adjacent to the cylinder wall, and
an ignition device located generally centrally of the cylinder head,
wherein the improvement is comprised in that:
said first inlet means includes a first duct in said cylinder head, said first duct extending substantially radially inwardly above the periphery of said cylinder and then curving through about a quarter-turn downward and immediately opening through the top of the combustion chamber to form a common inlet port between the axis and periphery of the cylinder;
an inlet valve having a head seated in said common inlet port for closing same and displaceable down into said cylinder for opening said common inlet port, there being a straight line first gas flow path radially inward and axially downward through (1) a part of the radially inward extending portion of the first duct, (2) the curved portion of the first duct, (3) the common inlet port and (4) past the part of the valve head nearest the center of the cylinder, to direct said first gas substantially centrally into said cylinder and without any substantial tangential component, there being one said first duct for each said inlet valve head in said cylinder head;
said second inlet means comprising a second duct in said cylinder head for each said inlet valve head, said second duct having a substantially straight outlet end portion extending along a chordal plane of said cylinder, said chordal plane being parallel to the upstanding cylinder axis and substantially perpendicular to said radial portion of said first duct, said chordal plane intersecting said curved portion of said first inlet duct and said common port at a location between the center of said inlet valve head and the adjacent peripheral wall of said cylinder, said second duct ending at an opening in the upstanding, substantially circumferentially facing sidewall of said first duct, the axis of said second duct extending from said ending of said second duct at said opening at said downward slope in said chordal plane through said terminal portion of said first duct to angle down under the level of the radially extending part of said first duct and above the open position of the head of said valve, such that said first and second ducts direct their respective gas streams at respective angles downwardly in respective mutually substantially perpendicular planes each parallel to the cylinder axis, with said second gas stream crossing under said first gas stream, to direct said second gas substantially tangentially along the peripheral wall of the cylinder;
said combustion chamber being cylindrical in form with a substantially planar top surface, said substantially planar top surface containing said inlet port, said combustion chamber being free of any portions projecting above said substantially planar upper surface;
said ignition device projecting down through said substantially planar top surface of said combustion chamber beside said inlet port and at a point along said straight line first gas flow path.

* * * * *

UNITED STATES PATENT OFFICE
CERTIFICATE OF CORRECTION

Patent No. 4,249,495　　　　　　　　Dated February 10, 1981

Inventor(s) John M. Trihey

It is certified that error appears in the above-identified patent and that said Letters Patent are hereby corrected as shown below:

Column 9, line 30; after "path" insert ---sloping---.

Signed and Sealed this

Twenty-sixth Day of May 1981

[SEAL]

*Attest:*

RENE D. TEGTMEYER

*Attesting Officer*　　　*Acting Commissioner of Patents and Trademarks*